United States Patent
Grudzewski et al.

(10) Patent No.: US 9,590,348 B2
(45) Date of Patent: Mar. 7, 2017

(54) SERVICEABLE FIXING SYSTEM FOR CONNECTORS

(71) Applicant: DELPHI TECHNOLOGIES, INC., Troy, MI (US)

(72) Inventors: Michal Grudzewski, Cracow (PL); Pawel Lesniak, Tarnow (PL); Krzysztof Pitala, Mszana Dolna (PL)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/852,713

(22) Filed: Sep. 14, 2015

(65) Prior Publication Data

US 2016/0079706 A1 Mar. 17, 2016

(30) Foreign Application Priority Data

Sep. 16, 2014 (EP) ..................................... 14184896

(51) Int. Cl.
| | | |
|---|---|---|
| *H01R 13/66* | (2006.01) | |
| *H01R 13/52* | (2006.01) | |
| *B60R 16/02* | (2006.01) | |

(52) U.S. Cl.
CPC ..... *H01R 13/5202* (2013.01); *B60R 16/0215* (2013.01); *B60R 16/0222* (2013.01)

(58) Field of Classification Search
CPC ............ H01R 13/5202; B60R 16/0215; B60R 16/0222
USPC ........................................ 439/550, 552, 555
See application file for complete search history.

(56) References Cited

U.S. PATENT DOCUMENTS

| | | | | | |
|---|---|---|---|---|---|
| 3,448,429 | A | * | 6/1969 | Szeremy | ................ H01R 13/74 439/552 |
| 4,589,719 | A | * | 5/1986 | Gentry | ................. H01R 13/745 439/552 |
| 4,684,190 | A | * | 8/1987 | Clark | ................. H01R 13/5219 439/277 |
| 4,753,613 | A | * | 6/1988 | Morgan | ............... H01R 13/514 439/291 |
| 5,066,247 | A | * | 11/1991 | Watson | ................ H01R 13/745 248/27.1 |
| 5,893,777 | A | * | 4/1999 | Kantor | ................... H01R 13/73 439/544 |
| 5,967,837 | A | * | 10/1999 | Wolfe | ...................... H01C 1/01 439/550 |
| 6,179,340 | B1 | * | 1/2001 | Adolf | ................. F16L 25/0036 285/140.1 |

(Continued)

FOREIGN PATENT DOCUMENTS

| | | |
|---|---|---|
| CN | 202585982 U | 12/2012 |
| DE | 3709461 A1 | 10/1987 |

(Continued)

*Primary Examiner* — Abdullah Riyami
*Assistant Examiner* — Nelson R Burgos-Guntin
(74) *Attorney, Agent, or Firm* — Robert J. Myers (57) ABSTRACT

A connector assembly configured to be mounted through an opening in a panel for providing a connection between different harnesses of a vehicle. The connector assembly includes a connector housing and a fixing element. The fixing element is configured to lock the connector housing to the panel when the connector housing is inserted into the opening in the panel and the fixing element is attached to the connector housing. The fixing element is configured to be releasably attached to the connector housing.

20 Claims, 4 Drawing Sheets

(56) References Cited

U.S. PATENT DOCUMENTS

| | | | | |
|---|---|---|---|---|
| 7,094,098 B2* | 8/2006 | Miyazaki | ............... | H01R 4/46 |
| | | | | 439/550 |
| 8,129,634 B2* | 3/2012 | Sheehan | ............. | H02G 3/0625 |
| | | | | 174/650 |
| 8,162,693 B2* | 4/2012 | Auray | ................... | H02G 3/065 |
| | | | | 174/657 |
| 8,979,580 B2* | 3/2015 | Bitzer | ............... | H01R 13/5202 |
| | | | | 439/271 |
| 2009/0124121 A1* | 5/2009 | Matsuoka | ............. | H01R 4/183 |
| | | | | 439/550 |
| 2010/0003850 A1* | 1/2010 | Bartholoma | ........ | H01R 13/748 |
| | | | | 439/550 |
| 2010/0041269 A1* | 2/2010 | Pham | .................. | H01H 50/048 |
| | | | | 439/555 |
| 2016/0079706 A1* | 3/2016 | Grudzewski | ........ | H01R 13/639 |
| | | | | 439/345 |

FOREIGN PATENT DOCUMENTS

| | | |
|---|---|---|
| DE | 102005004583 B3 | 6/2006 |
| EP | 1095431 B1 | 8/2002 |
| EP | 1914847 A2 | 4/2008 |
| EP | 2747214 A1 | 6/2014 |
| JP | 2008305747 A | 12/2008 |
| JP | 2014022206 A | 2/2014 |
| WO | 2007051486 A1 | 5/2007 |

* cited by examiner

SERVICEABLE FIXING SYSTEM FOR CONNECTORS

CROSS-REFERENCE TO RELATED APPLICATION

This application claims the benefit under 35 U.S.C. §119 (a) of Patent Application No. 14184896.0 filed in the European Patent Office (EPO) on Sep. 16, 2014, the entire disclosure of which is hereby incorporated by reference.

TECHNICAL FIELD OF THE INVENTION

The invention in general relates to a connector assembly to be mounted through an opening in a panel, in particular to provide a connection between different harnesses of a vehicle.

BACKGROUND OF THE INVENTION

Modern vehicles, such as passenger cars, include a number of electric devices, which are comprised in the door assembly, such as electrical window openers, side airbags, loud speakers, switches for the electrical adjustment of passenger seats, sensors to activate the interior lights of the vehicle upon opening the door, actuating devices, means to adjust the rear view mirrors, etc. All or most of the electrical systems incorporated in the door assembly are controlled and powered by control systems which are accommodated somewhere in for example the engine compartment of the vehicle. Therefore, it is necessary to connect the electric devices of the door assembly with the control means and power supply located somewhere in the main body of the vehicle.

Since the door assembly is moveable with regard to the body of the vehicle, the connection has to be flexible and is usually realized in the form of a cable bundle. For manufacturing reasons this cable bundle usually extends through a panel of the door assembly and is provided on its free end with an electrical connector. The counter-connector is provided with another cable bundle which connects the counter-connector with the control system and power system of the vehicle. During assembly of the vehicle, the counter-connector is mounted through an opening in the panel of an A-pillar or B-pillar of the vehicle such that the connector can be coupled with the counter-connector through this opening in the panel. The assembly of the counter-connector to the pillar is usually done from inside the pillar. Due to vibrations occurring during the operation of the vehicle, the counter-connector has to be fixed to the pass through hole and the pillar. Additionally, the work environment of the connectors requires that the pillar connector is sufficiently sealed against moisture and/or dust and similar. It is therefore necessary to secure fixation of the counter-connector to the pass-through hole in the pillar.

Particular requirements have to be considered for heavy duty applications. Connections between different parts of commercial vehicles, such as e.g. trucks, require an especially robust design to provide a connection despite the heavy loads to which the connections are disposed. In such applications inline male connectors have to be securely fixed typically to sheet metal holes for providing connection between, for example, different truck harnesses, such as between the body harness and front end harness.

Traditional fixation systems make use of screws to fix the counter-connector, or pillar connector, to the pass-through mounting hole. However, the assembly of such systems is more complicated due to the use of screws and since more parts need to be handled during the assembly operation. In addition, the use of screws makes additional holes in the pillar necessary, which is also disadvantageous.

Other connector systems make use of locking slides, which are usually delivered as a loose piece and are attached to the counter-connector, or male connector, when the connector is mounted through the pass-through hole in the pillar. The provision of the locking slide thereby prevents removal of the male connector from the pillar. In order to lock the locking slide to the male connector, small locks are usually provided on these slides which permanently secure the locking slide to the male connector during assembly. However, these small locks are easily damaged during maintenance, transport and/or usage.

Further on, the prior art locking sliders described above have to be delivered separately, in order to not unintentionally lock the locking slide permanently to the male connector if the locking slides were pre-mounted to the male connectors. Since the locking slides are hence not provided on the male connectors during transport, a seal which may be provided on a male connector is exposed and hence easily displaced or detached during transport. Similarly, also secondary locks provided on the connectors are not protected since the locking slides are not provided thereon during transport, so that the secondary locks can unintentionally be closed during transport and/or maintenance.

Further on, the prior art locking slider, and in particular the small locks provided thereon, can easily be destroyed or at least partly damaged during maintenance if the connector system has to be dissembled.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to the invention a connector assembly is provided, which is to be mounted through an opening in a panel, and in particular through a sheet metal hole of a panel of a commercial vehicle, such as for example of a truck. In particular, the connector assembly is designed to be mounted through a sheet metal hole to provide a connection between different harnesses of a commercial vehicle.

The connector assembly comprises a connector housing, which may comprise a mating face which is configured to extend through the opening of the panel when the connector housing is mounted from one side to the panel. The term housing thereby denotes to any kind of component mountable to the panel. If the panel is for example a part of a pillar of a vehicle, the connector housing can for example be mounted from the "interior" side, or inner side, of the panel.

The connector assembly further comprises a fixing element, which is configured to lock the connector housing to the panel when the connector housing is inserted from one side into the opening in the panel. By attaching the fixing element onto the connector housing on the other side of the panel, i.e. on the end of the connector housing which is provided through the opening in the panel, the connector housing is locked to the panel. The fixing element is thereby configured to be releasable attached to the connector housing and is separate from the connector housing.

The term "releasable" as used herein denotes to being releasable in a non-destructive manner. In other words, the fixing element can be released without inducing any damage to the fixing element, the connector housing or to the panel. Accordingly, being releasable attachable implies that the part is serviceable. The skilled person understands that serviceable means that the serviceable part can be mounted and un-mounted during standard maintenance procedures without impairing the quality of the part.

Accordingly, the connector assembly of the present invention allows for transport of the connector assembly as a whole with the fixing element attached to the connector housing. This allows for reduced transport cost since the connector assembly can be delivered in one piece to a production site where the connector assembly is mounted to the panel. Further on, a sealing member, which may be provided on the connector housing prior to shipping the assembly to the production site, is shielded by the attached fixing element, thereby reducing the likelihood that the sealing member is damaged or displaced during shipping and handling of the connector assembly. Also, due to the shielding function provided by the attached fixing element, a secondary lock, which may be provided on or integrated in the connector housing, is protected from being unintentionally closed during transport and/or maintenance. Since the fixing element is releasable attached to the connector housing, the fixing element can be detached from the connector housing prior to inserting the connector housing into the opening in the panel, and can be attached to the connector housing afterwards. Also during later maintenance operations, the connector assembly can be detached from the panel and remounted to the panel without having to replace the fixing element.

In a preferred embodiment, the fixing element comprises at least one arm having engaging means, the engaging means being configured to engage respective counter-engaging means of the connector housing such that the fixing element is fixed or attached onto the connector housing. In a preferred embodiment, the engaging means are provided on at least one flexible portion of the at least one arm. The flexible portion can thus be flexed in order to unset the locking function of the fixing element. In other words, by flexing the flexible portion of the arm, the engaging means provided on the flexible portion of the arm is detached from the respective counter-engaging means provided on the connector housing. Accordingly, the fixing element can be releasable attached to the connector housing.

The engaging means provided on the fixing element comprises a hook and/or a ramp, and the counter-engaging means provided on the connector housing comprises a recess or notch configured to receive the engaging means. In another preferred embodiment, the counter-engaging means provided on the connector housing comprises a hook and/or a ramp, while the engaging means provided on the fixing element comprise a recess or notch configured to receive the counter-engaging means. The ramp is in both cases configured to flex, bend or temporarily deform the fixing element such that the engaging means of the fixing element do not induce any blocking function while attaching the fixing element onto the connector housing.

In a further preferred embodiment the connector housing comprises at least one overstress pad and the fixing element comprises at least one guiding channel. During attachment and detachment of the fixing element to the connector housing, the overstress pad interacts with the guiding channel. Thereby the movement of the fixing element is limited. In a preferred embodiment, where the guiding channel is provided on the at least one flexible portion of the at least one arm of the fixing element, the overstress pad of the connector housing is in contact with at least one side wall of the guiding channel during attachment and detachment of the fixing element to the connector housing. This contact, or the interaction between the overstress pad and the guiding channel, limits the flexible movement of the fixing element. Accordingly, by limiting the flexible movement of the fixing element, it is less likely that the fixing element breaks or deforms during attachment and detachment. The guiding channels comprise two side walls which are inclined with respect to each other such that the channel narrows in longitudinal direction. Accordingly, the flexible movement of the fixing element is efficiently controlled during the entire attachment and detachment procedure. The skilled person understands that the at least one overstress pad may be provided on the fixing element and the at least one guiding channel may be provided on the connector housing instead.

The connector assembly described herein is particularly useful for providing a connection through a sheet metal of commercial vehicles, where a connection between different harnesses has to be made. However, the connector assembly according to the present invention can also be utilized in other applications to provide a connection between different parts of any vehicle, craft or construction. Accordingly, the connector assembly can be applied to provide a connection between a vehicle body and a vehicle door of a passenger car.

A fixing element according to the present invention is configured to be releasable attached to a connector housing for locking the connector housing to a panel. The fixing element comprises at least one arm, which has at least one flexible portion. The fixing element further comprises engaging means which are provided on the flexible portion configured to engage the connector housing when the fixing element is attached thereto. The fixing element in addition features at least one guiding channel which is also provided on the flexible portion and is configured to interact with the connector housing when the fixing element is attached to the connector housing or detached therefrom.

In a preferred embodiment the at least one guiding channel comprises two side walls that are inclined with respect to each other such that the channel narrows in longitudinal direction.

It is hence possible to mount and dismount the fixing element in a serviceable manner. The provision of the guiding channel and in particular its shape prevents that the fixing element is damaged when releasable attaching the fixing element to a connector housing.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

It is an object of the present invention to provide a connector assembly that is intended to be mounted through an opening in a panel, in particular for a sheet metal fixation system for connectors, which reduces or minimizes the above described problems and disadvantages. It is in particular an object of the present invention to provide a connector assembly which can easily be mounted and dismounted. It is a further object of the present invention to provide a connector assembly which can be delivered in one part and allows for multiple assembling and dissembling procedures of the connector assembly without destroying or damaging the individual components. It is hence an object of the present invention to provide a serviceable locking mechanism which allows for non-destructive locking and unlocking of the connector assembly.

These and other objects, which become apparent by reading the following description, are achieved by the present invention according to the subject matter of the independent claims.

Figure 1:
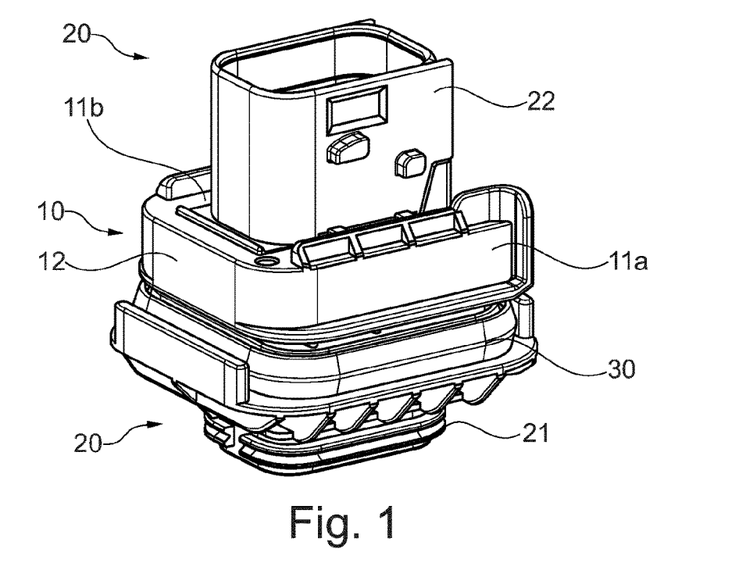
FIG. 1 is a schematic illustration of a connector assembly according to the present invention.

FIG. 1 shows a connector assembly comprising a connector housing 20, which comprises a plug-in portion 21 and a mating face 22. When mounted to a panel of a vehicle, the mating face 22 and the plug-in portion 21 of the connector housing 20 are on opposing sides of the panel. The connector housing 20 further comprises a sealing member 30, which is made of rubber and/or silicone. The sealing member 30 is of a ring-like structure and is configured to sufficiently seal the opening of the panel against moisture and/or dust and similar when the connector assembly is mounted through the opening.

The connector assembly of FIG. 1 further comprises a fixing element 10, which has essentially a U-shape comprising two parallel arms 11a, 11b which are connected by a common portion 12 (see also FIGS. 3 and 4) such that the fixing element 10 can be clamped onto the connector housing 20 for attachment thereto. As can be seen from FIG. 2, there are provided engaging means 13a on the end of arm 11a of fixing element 10, which engages a respective counter-engaging means 23a of the connector housing 20 when the fixing element 10 is attached thereto. A respective engaging means 13b is also provided on the end of the other arm 11b, as can also be seen form FIGS. 3 and 4, which engages a respective counter-engaging means 23b. The illustrated counter-engaging means 23a, 23b of the connector housing 20 comprise an edge to which the engaging means 13a, 13b of the fixing element 10 can adhere or clutch.

Figure 2:
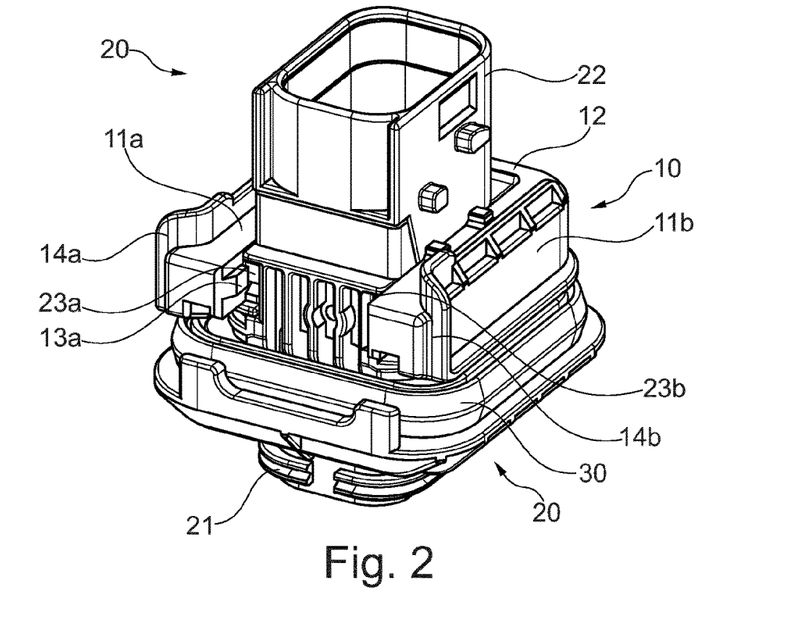
FIG. 2 shows the connector assembly of FIG. 1 in another orientation.

By pushing the ends of the arms 11a, 11b of the fixing element 10 further apart from each other, an operator can unlock the fixing element 10 from the connector housing 20 and remove the fixing element 10 therefrom. The fixing element 10 features handling means 14a, 14b which allow for an easy bending of the fixing element 10 by the operator.

Figure 3:
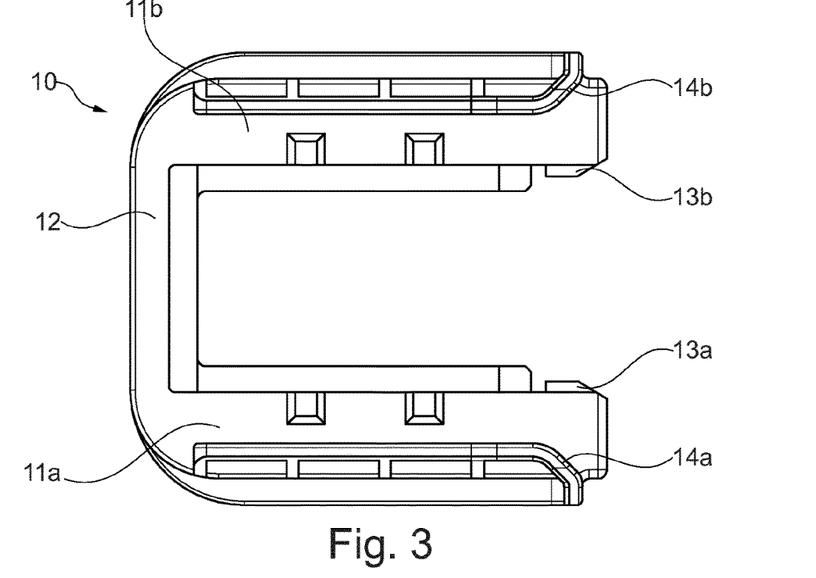
FIG. 3 shows one side of a fixing element according to the present invention.

As can be seen from FIG. 3, the engaging means 13a, 13b of the fixing element 10 are hooks and/or ramps. A hook provides a save locking of the fixing element 10 to the connector housing 20, while a ramp allows for an easy insertion of the fixing element 10 to the connector housing 20: When inserting the fixing element 10 onto the connector housing 20, the wedge of the ramp interacts with the connector housing 20 to deflect the arms 11a, 11b of the fixing element 10 such that the engaging means 13a, 13b do not block the fixing element 10 from being inserted onto the connector housing 20.

Figure 4:
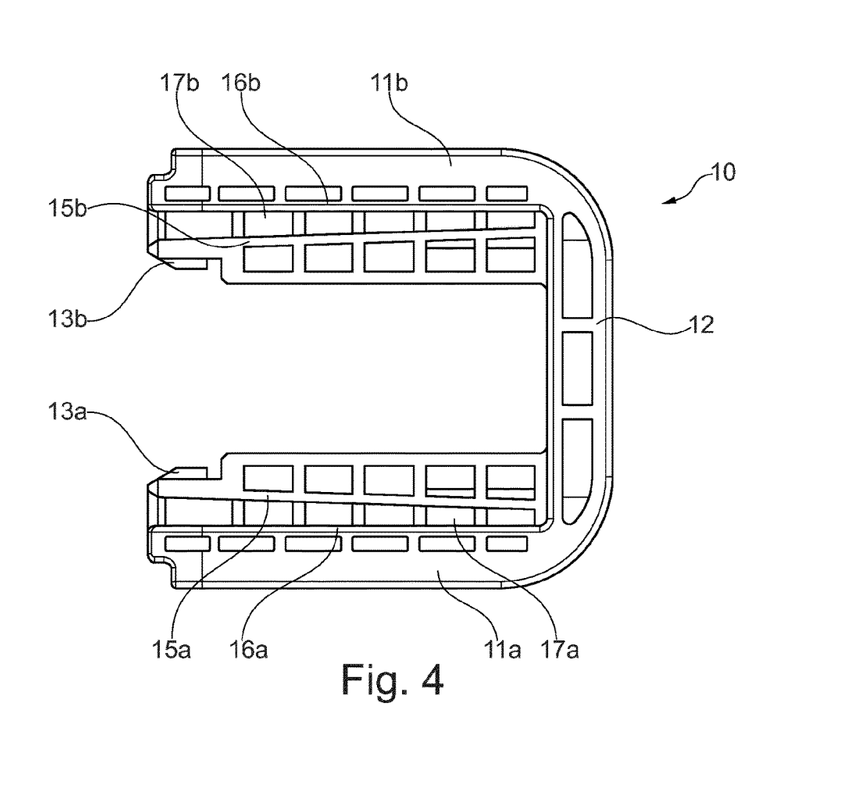
FIG. 4 shows another side of the fixing element of FIG. 3.

FIG. 4 shows the bottom side of fixing element 10 of FIG. 3. On each arm 11a, 11b there is provided a guiding channel 17a, 17b. Each guiding channel 17a, 17b is formed of an inner side wall 15a, 15b and a respective outer side wall 16a, 16b. However, for the purposes of this invention a channel comprising only the inner side wall 15a, 15b is also feasible, i.e. the channel does not necessarily have to have two side walls. The inner side walls 15a, 15b are inclined with respect to the outer side walls 16a, 16b such that the guiding channel 17a, 17b narrows in longitudinal direction. In other words, the distance between the inner side walls 15a, 15b and outer side walls 16a, 16b increases towards the end of the arms 11a, 11b. The inclination angle between the inner side wall 15a, 15b and outer side wall 16a, 16b is in the range of 0.5° to 5°.

Figure 5:
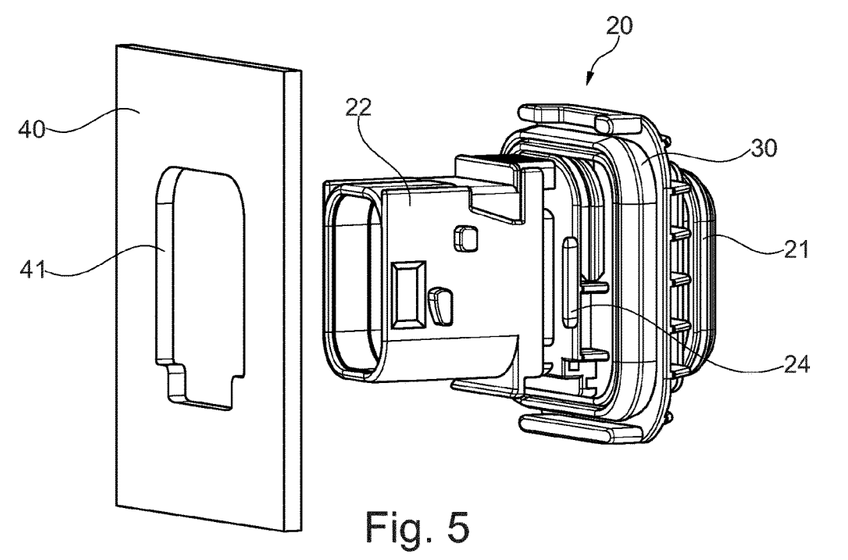
FIG. 5 is a schematic illustration of a connector housing according to the present invention prior to installation to a panel.
Figure 6:
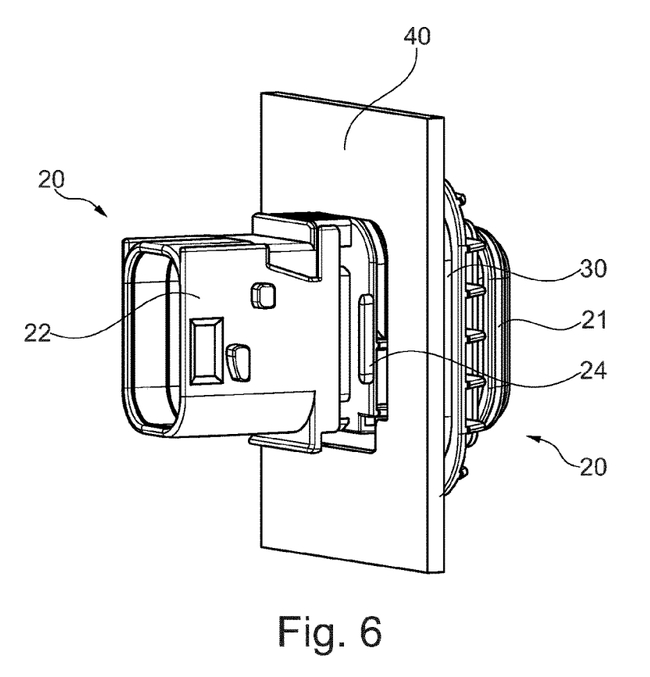
FIG. 6 is a schematic illustration of the connector housing of FIG. 5 inserted through an opening of the panel.

The guiding channels 17a, 17b are configured to interact with respective overstress pads 24 of the connector housing 20. As can be seen from FIGS. 5 and 6, the overstress pad 24 is provided on the connector housing 20 such that it extends through the opening 41 of the panel 40 when the connector housing 20 is inserted into the opening 41. Although only one overstress pad 24 is illustrated, the skilled person understands that a respective second overstress pad is also provided on the other side of the connector housing 20 illustrated in the figures to interact with the respective second arm of fixing element 10.

The skilled person understands that the overstress pad 24 may be of any form, such as e.g. of a pillar-like structure or of an extended plate-like structure as illustrated in the figures. It will further be appreciated that a guiding channel can also be provided on the connector housing 20, and respective pads to interact with the channel can be provided on the fixing element 10.

Figure 7:
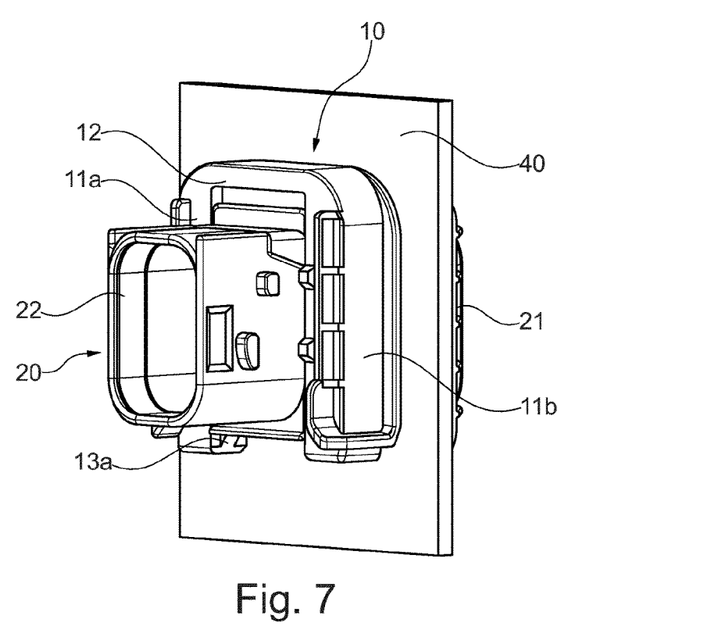
FIG. 7 is a schematic illustration of a connector assembly according to the present invention mounted to a panel.

FIG. 7 illustrates the connector assembly being fully mounted, i.e. the connector housing 20 being inserted through the opening 41 of the panel 40 and the fixing element 10 being attached to the connector housing 20. In this configuration the connector assembly is locked to the panel 40, and due to the provision of sealing member 30 a sealing function is obtained. Since the fixing element 10 locks the connector housing 20 to the panel 40, no further locking means are necessary. Accordingly, integrally formed locking means provided on the connector housing are not necessary, improving the lifetime of the connector housing 20.

When the fixing element 10 is attached onto the connector housing 20, the arms 11a, 11b of the fixing element 10 are deflected due to the form of the engaging means 13a, 13b allowing for an insertion of the fixing element 10 onto the connector housing 20. Alternatively also an operator can bend the arms of the fixing element 10 in order to attach it to the connector housing 20.

Figure 8:
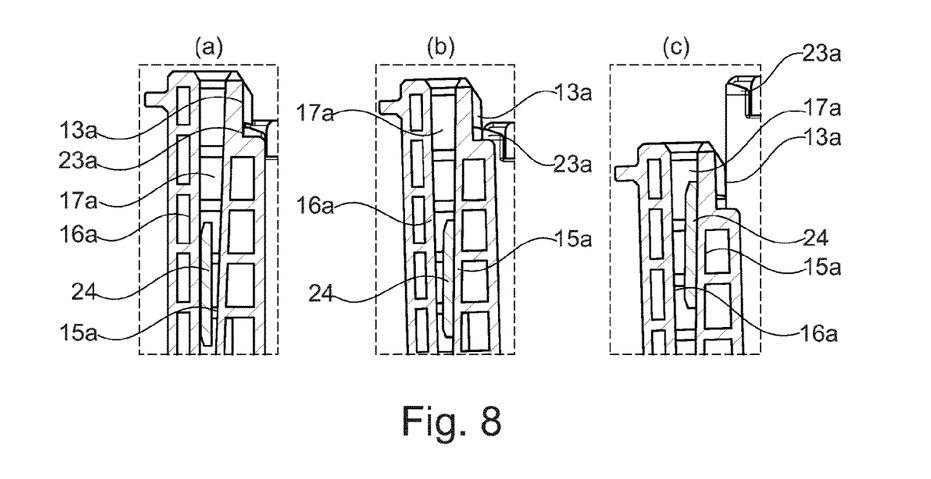
FIG. 8 shows the profile of a section of a connector assembly according to the present invention during detachment.

FIG. 8 shows the interaction between the connector housing 20 and arm 11a of fixing element 10 during the detachment procedure. In step (a) the fixing element 10 is locked onto the connector housing 20, as the engaging means 13a is ledged behind a respective counter-engaging means 23a of the connector housing 20. Further on, the overstress pad 24 of the connector housing 20 is provided in the guiding channel 17a of the fixing element 10.

In step (b) the arm 11a of fixing element 10 is flexed or deflected such that the engaging means 13a is no longer in contact with the respective counter-engaging means 23a of the connector housing 20. The extent of deflection is thereby limited due to the interaction of overstress pad 24 with an inner side wall 15a of the guiding channel 17a. Accordingly, the arm 11a of fixing element 10 can only be flexed so far until the overstress pad 24 contacts the inner side wall 15a of the guiding channel 17a of fixing element 10.

In step (c) the fixing element 10 is removed from the connector housing 20, i.e. the fixing element 10 is extracted therefrom. Due to the contact of overstress pad 24 with the inner side wall 15a of guiding channel 17a of fixing element 10 and due to the orientation (i.e. due to the inclination angle) of the inner side wall 15a, the maximum extend of deflection of arm 11a of fixing element 10 is controlled throughout the extraction process.

The skilled person understands that in the illustrated embodiments the outer side wall 16a, 16b of fixing element 10 is not necessary for guiding the arms 11a, 11b of fixing element 10 along the overstress pad 24 during attachment or detachment.

When attaching the fixing element 10 to the connector housing 20, the interaction of the overstress pad 24 with the guiding channel 17a again hinders an extensive bending of the fixing element 10. In this process the steps illustrated in FIG. 8 are to be considered reversed.

The fixing element 10 can be attached to the connector housing 20 irrespective of whether the connector housing 20 is provided through an opening 41 of a panel 40. Accordingly the fixing element 10 can be pre-attached onto the connector housing 20 during transportation, allowing for an easy transportation of the entire connector assembly.

The structure and functionality of the fixing element 10 further allows for mounting the fixing element 10 several times to the connector housing 20. The connector housing 20 can be locked and unlocked for at least 1,000 times with the same fixing element 10, i.e. without breaking, damaging or otherwise impairing the functionality of the fixing element 10.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

The invention claimed is:

1. A connector assembly configured to be mounted through an opening in a panel of a vehicle, the connector assembly comprising:
   a connector housing;
   a fixing element configured to be releasably attached to the connector housing and configured to lock the connector housing to the panel when the connector housing is inserted into the opening in the panel and the fixing element is attached to the connector housing, wherein the fixing element further comprises a guiding channel; and
   an overstress pad, wherein the overstress pad interacts with the guiding channel to limit movement of the fixing element during attachment and detachment of the fixing element to the connector housing.

2. The connector assembly according to claim 1, wherein the fixing element is separate from the connector housing.

3. The connector assembly according to claim 1, further comprising a sealing member arranged on the connector housing, wherein the sealing member comprises a sealing ring.

4. The connector assembly according to claim 3, wherein the sealing member is in contact with the panel when the connector assembly is mounted through the opening in the panel and wherein the fixing element and the sealing member are provided on opposite sides of the panel when the connector assembly is mounted through the opening in the panel.

5. The connector assembly according to claim 1, wherein the connector housing does not comprise integrally formed locking means for locking the connector housing onto the panel.

6. The connector assembly according to claim 1, wherein the fixing element has a U-shape comprising two parallel arms being connected by a common portion, such that the fixing element can be clamped onto the connector housing for attachment thereto.

7. The connector assembly according to claim 1, wherein the fixing element comprises an arm having engaging means configured to engage respective counter-engaging means of the connector housing to attach the fixing element onto the connector housing and wherein the engaging means comprises a hook.

8. The connector assembly according to claim 7, wherein the engaging means is provided on a flexible portion of the arm.

9. The connector assembly according to claim 1, wherein the guiding channel is provided on the flexible portion of the arm of the fixing element.

10. The connector assembly according to claim 9, wherein the guiding channel comprises two side walls that are inclined with respect to each other such that the channel narrows in longitudinal direction.

11. The connector assembly according to claim 10, wherein an inclination angle between the two side walls is in a range of 0.5° to 5°.

12. The connector assembly according to claim 1, wherein the fixing element is configured to be releasably attached to the connector housing when the connector assembly is not mounted through the opening in the panel.

13. A fixing element releasably attached to a connector housing for locking said connector housing to a panel of a vehicle, the fixing element comprising:
   an arm having a flexible portion;
   an engaging means provided on the flexible portion of the arm configured to engage the connector housing when the fixing element is attached thereto; and
   a guiding channel provided on the flexible portion of the arm configured to interact with the connector housing when the fixing element is attached to or detached from the connector housing, wherein the guiding channel comprises two side walls that are inclined with respect to each other such that the channel narrows in longitudinal direction and wherein an inclination angle between the two side walls is in a range of 0.5° to 5°.

14. The connector assembly according to claim 1, wherein the fixing element comprises an arm having engaging means configured to engage respective counter-engaging means of the connector housing to attach the fixing element onto the connector housing, wherein the engaging means comprises a ramp.

15. The connector assembly according to claim 1, wherein the overstress pad of the connector housing is in contact with a side wall of the guiding channel during attachment and detachment of the fixing element to the connector housing.

16. The connector assembly according to claim 1, wherein the fixing element is configured to be releasably attached to the connector housing, such that the connector housing can be locked and unlocked for at least 1000 times.

17. The connector assembly according to claim 11, wherein the inclination angle between the two side walls is in a range of 1° to 3°.

18. The connector assembly according to claim 17, wherein the inclination angle between the two side walls is about 2°.

19. The connector assembly according to claim 13, wherein the inclination angle between the two side walls is in a range of 1° to 3°.

20. The connector assembly according to claim 19, wherein the inclination angle between the two side walls is about 2°.

\* \* \* \* \*